(12) United States Patent
Akiyama

(10) Patent No.: US 9,374,272 B2
(45) Date of Patent: Jun. 21, 2016

(54) DATA PROCESSING APPARATUS, COMPUTER-READABLE RECORDING MEDIUM, AND DATA PROCESSING SYSTEM

(71) Applicant: Toshio Akiyama, Tokyo (JP)

(72) Inventor: Toshio Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 13/771,697

(22) Filed: Feb. 20, 2013

(65) Prior Publication Data
US 2013/0232239 A1 Sep. 5, 2013

(30) Foreign Application Priority Data
Mar. 5, 2012 (JP) ................................. 2012-047869

(51) Int. Cl.
*H04L 12/24* (2006.01)
*G06F 21/31* (2013.01)

(52) U.S. Cl.
CPC ............ *H04L 41/0803* (2013.01); *G06F 21/31* (2013.01); *H04L 41/0806* (2013.01); *H04L 41/0889* (2013.01)

(58) Field of Classification Search
CPC ........... G06F 15/00; G06F 15/16; G06F 9/44; G06F 3/12; H04L 41/0803; H04L 41/0806; H04L 41/0889; H04L 41/00; H04L 41/08; H04L 41/0813; H04L 41/082; H04L 41/0876–41/0886; H04L 41/50; H04L 41/5012; H04L 41/5016; H04L 43/00; H04L 43/08–43/0805; H04L 63/00; H04L 63/08; H04L 63/083; H04L 63/0846; H04L 63/10; H04L 63/108

USPC ......... 709/201–203, 217, 219, 220, 222, 226, 709/227, 228, 245
See application file for complete search history.

(56) References Cited

U.S. PATENT DOCUMENTS 5,564,018 A * 10/1996 Flores et al. .................. 709/206
5,564,038 A * 10/1996 Grantz .................... G06F 21/10
340/5.28

(Continued)

FOREIGN PATENT DOCUMENTS

| JP | 2000-353079 | 12/2000 |
|---|---|---|
| JP | 2003-131976 | 5/2003 |

(Continued)

OTHER PUBLICATIONS

Office Action for corresponding Japanese Application No. 2012-047869 dated Dec. 15, 2015.

(Continued)

*Primary Examiner* — Brian J Gillis
*Assistant Examiner* — Boris Grijalva Lobos
(74) *Attorney, Agent, or Firm* — Harness, Dickey & Pierce

(57) ABSTRACT

A data processing apparatus includes a receiving unit configured to receive an input of user information, a determining unit configured to determine a destination corresponding to the user information, a preparing unit configured to prepare a computer program for enabling an information terminal device to which the computer program is installed to use a data processing function provided by the data processing apparatus and configuration information related to the data processing function, and a transmitting unit configured to transmit instruction information giving an instruction as to how the computer program and the configuration information are acquired to the destination thus determined over a network.

9 Claims, 14 Drawing Sheets

(56) References Cited

U.S. PATENT DOCUMENTS

| | | | | |
|---|---|---|---|---|
| 5,625,887 | A * | 4/1997 | Cassidy | H04W 12/06 455/509 |
| 6,055,637 | A * | 4/2000 | Hudson | G06F 21/6218 709/225 |
| 6,259,405 | B1 * | 7/2001 | Stewart | H04W 15/8033 342/457 |
| 6,587,873 | B1 * | 7/2003 | Nobakht | H04L 29/06 348/E5.006 |
| 6,683,546 | B1 * | 1/2004 | Torrubia-Saez | G06F 21/10 341/51 |
| 6,968,385 | B1 * | 11/2005 | Gilbert | G06F 21/6218 709/229 |
| 7,212,304 | B2 * | 5/2007 | McIntyre et al. | 358/1.15 |
| 7,284,044 | B2 * | 10/2007 | Teraoka et al. | 709/221 |
| 7,359,076 | B2 * | 4/2008 | Uchino | G06F 21/608 358/1.15 |
| 7,375,835 | B1 * | 5/2008 | Hull et al. | 358/1.15 |
| 7,477,745 | B2 * | 1/2009 | Nakamura | G06F 21/10 380/243 |
| 7,600,226 | B2 * | 10/2009 | Aiba et al. | 717/171 |
| 7,649,639 | B2 * | 1/2010 | Oshiumi | G06F 3/1222 358/1.13 |
| 7,768,664 | B2 * | 8/2010 | Asano | 358/1.15 |
| 7,853,495 | B2 * | 12/2010 | Kamada | G06F 21/10 705/32 |
| 7,937,458 | B2 * | 5/2011 | Nanamura | G06F 9/46 700/94 |
| 8,005,725 | B2 | 8/2011 | Takahashi et al. | |
| 8,141,072 | B2 * | 3/2012 | Garrett | G06F 9/4446 717/174 |
| 8,216,071 | B2 * | 7/2012 | Lee | A63F 13/12 463/42 |
| 8,336,096 | B2 * | 12/2012 | Narusawa | H04L 9/3231 370/252 |
| 8,368,740 | B2 * | 2/2013 | Otake | H04L 63/102 348/14.08 |
| 8,427,675 | B2 * | 4/2013 | Selvaraj et al. | 358/1.15 |
| 8,520,225 | B2 * | 8/2013 | Selvaraj et al. | 358/1.13 |
| 8,640,102 | B2 * | 1/2014 | Ogura | G06F 8/62 705/51 |
| 8,645,278 | B2 * | 2/2014 | Fernandez Gutierez | G06Q 30/0185 705/50 |
| 8,773,687 | B2 * | 7/2014 | Liu | 358/1.15 |
| 8,836,981 | B2 * | 9/2014 | Takahashi | 358/1.15 |
| 9,047,458 | B2 * | 6/2015 | Etchegoyen | G06F 21/31 |
| 2002/0004785 | A1 * | 1/2002 | Schull | G03B 13/02 705/51 |
| 2002/0083131 | A1 * | 6/2002 | Machida | 709/203 |
| 2002/0104019 | A1 * | 8/2002 | Chatani | G06F 21/10 726/27 |
| 2002/0140960 | A1 * | 10/2002 | Ishikawa | 358/1.13 |
| 2002/0152395 | A1 * | 10/2002 | Zhang | G06F 21/10 726/26 |
| 2002/0174356 | A1 * | 11/2002 | Padole | G06F 21/10 726/26 |
| 2003/0030834 | A1 * | 2/2003 | Parry | 358/1.14 |
| 2003/0069972 | A1 * | 4/2003 | Yoshimura et al. | 709/226 |
| 2003/0072022 | A1 * | 4/2003 | Someno | 358/1.13 |
| 2003/0084132 | A1 * | 5/2003 | Ohta | 709/221 |
| 2003/0154425 | A1 * | 8/2003 | Kim | 714/25 |
| 2003/0188145 | A1 * | 10/2003 | Richardson et al. | 713/1 |
| 2004/0015959 | A1 | 1/2004 | Kobayashi | |
| 2004/0215785 | A1 * | 10/2004 | Shima | 709/227 |
| 2004/0249934 | A1 | 12/2004 | Anderson et al. | |
| 2004/0263900 | A1 * | 12/2004 | Nguyen et al. | 358/1.15 |
| 2005/0210464 | A1 | 9/2005 | Machida | |
| 2006/0136566 | A1 * | 6/2006 | Ohara et al. | 709/217 |
| 2006/0170946 | A1 * | 8/2006 | Kawamura | 358/1.13 |
| 2007/0101345 | A1 * | 5/2007 | Takagi | G06F 9/4411 719/321 |
| 2007/0220512 | A1 * | 9/2007 | Pfahler | 717/177 |
| 2007/0234354 | A1 * | 10/2007 | Hattori | 717/177 |
| 2008/0028453 | A1 * | 1/2008 | Nguyen | G06F 21/335 726/9 |
| 2008/0055640 | A1 * | 3/2008 | Takahashi et al. | 358/1.15 |
| 2008/0079286 | A1 * | 4/2008 | Ferlitsch et al. | 296/186.1 |
| 2009/0025015 | A1 * | 1/2009 | Kurabayashi | 719/327 |
| 2009/0268235 | A1 * | 10/2009 | Lee | 358/1.15 |
| 2010/0302589 | A1 * | 12/2010 | Kobayashi | 358/1.15 |
| 2011/0058208 | A1 * | 3/2011 | Takahashi | 358/1.14 |
| 2011/0283275 | A1 * | 11/2011 | Dan | 717/176 |
| 2011/0307907 | A1 * | 12/2011 | Hwang et al. | 719/327 |
| 2011/0320611 | A1 * | 12/2011 | Inada et al. | 709/227 |
| 2013/0097258 | A1 * | 4/2013 | Kaneko | 709/206 |

FOREIGN PATENT DOCUMENTS

| | | |
|---|---|---|
| JP | 2004362589 A | 12/2004 |
| JP | 2005135367 A | 5/2005 |
| JP | 2005-301608 | 10/2005 |
| JP | 2008009961 A | 1/2008 |
| JP | 2009070202 A | 4/2009 |
| JP | 4340476 | 7/2009 |
| JP | 2010183358 A | 8/2010 |

OTHER PUBLICATIONS

Office Action for corresponding Japanese Application No. 2012-047869 dated Mar. 8, 2016.

* cited by examiner

INSTALLATION PACKAGE DISTRIBUTION CONFIGURATION - DISTRIBUTION CONFIGURATIONS

222 — PACKAGE ACQUISITION ROUTE:
- ● ACQUIRE AS EMAIL ATTACHMENT (224a)
- ○ ACQUIRE FROM WEB SERVER (224b)
- ○ ACQUIRE FROM SHARED FOLDER (224c)

226 — PERMISSION FOR TEMPORARY USE:
- 228a ● PERMIT    228b ○ DO NOT PERMIT

RESTRICTION ON TIME PERMITTED TO USE: [24 HOURS ▼] ~230

RESTRICTION ON QUANTITY PERMITTED TO PRINT: [NONE ▼] ~232    (UNIT SETTING) ~234

OPERATION PERFORMED WHEN UPPER LIMIT IS REACHED: [APPLY RESTRICTION AFTER CURRENT JOB IS COMPLETED ▼] ~236

RESTRICTED FUNCTIONS: ☑ MONOCHROMATIC (238a)  ☑ COLOR (238b)

[RETURN] 244    [SET] 240    [CANCEL] 242

FIG.9

| USER CODE | ACCOUNT ID | USER NAME | EMAIL ADDRESS | USE RESTRICTION | AUTHORIZED USER |
|---|---|---|---|---|---|
| A0000001 | 00001 | USER A | user_a@xxx.xxx.xo.jp | none | yes |
| A0000002 | 00002 | USER B | user_b@xxx.xxx.xo.jp | limit times: 100 | yes |
| ... | ... | ... | ... | ... | ... |
| T0000001 | - | - | user_z@xxx.xxx.xo.jp | expire date: xxxx/xx/xx/12:30 | no |

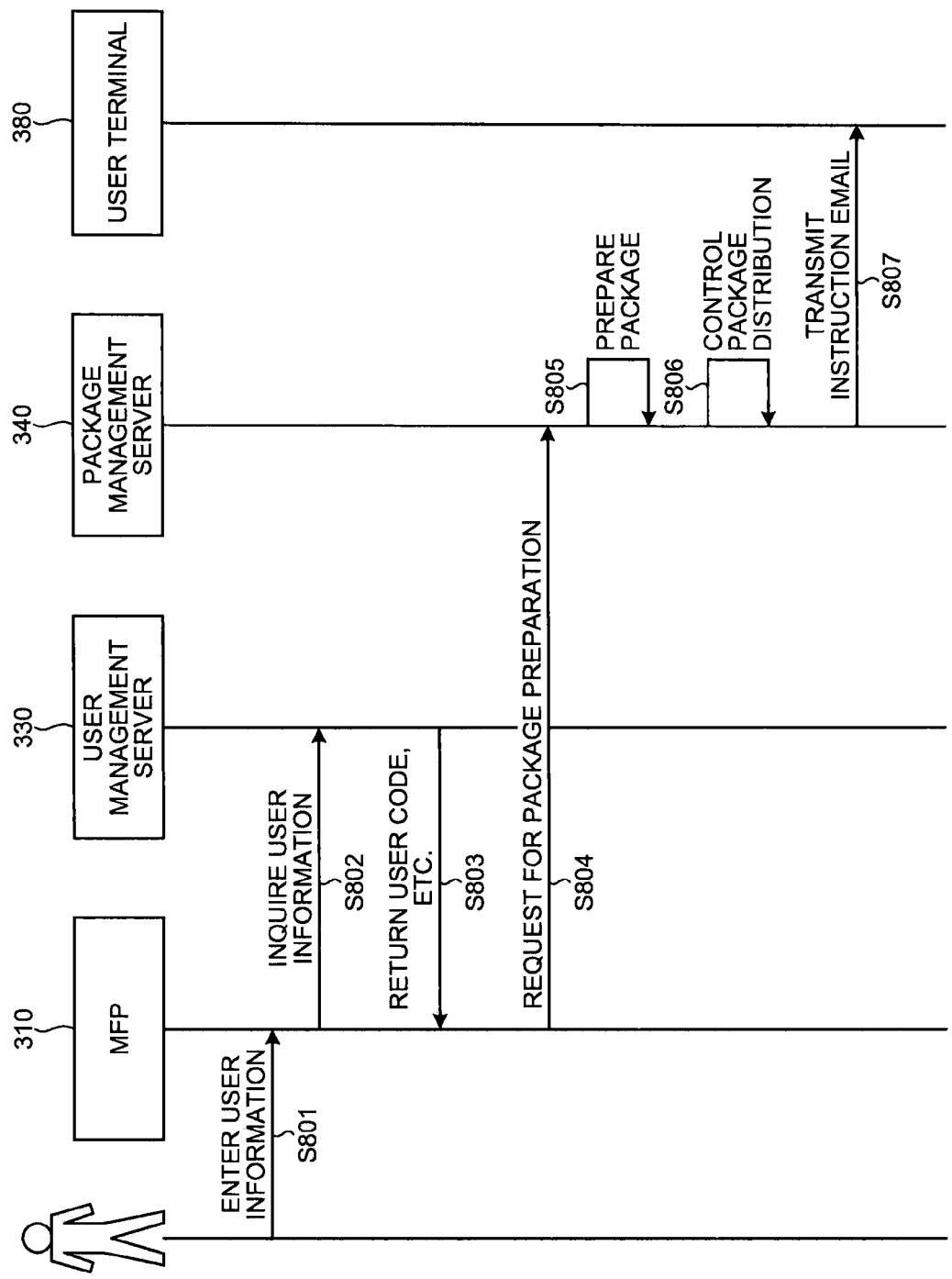

DATA PROCESSING APPARATUS, COMPUTER-READABLE RECORDING MEDIUM, AND DATA PROCESSING SYSTEM

CROSS-REFERENCE TO RELATED APPLICATIONS

The present application claims priority to and incorporates by reference the entire contents of Japanese Patent Application No. 2012-047869 filed in Japan on Mar. 5, 2012.

BACKGROUND OF THE INVENTION

1. Field of the Invention

The present invention relates to a technology for distributing a computer program for using a data processing apparatus, and more specifically, to a data processing apparatus, a computer-readable recording medium that contains a computer program, and a data processing system aiding a user in installing and configuring a computer program for making a data processing apparatus usable to an information terminal device.

2. Description of the Related Art

Recently, various restrictions have become imposed on use of a multifunctional peripheral (MFP) or a printer, from the viewpoints of saving resources, reducing costs, and ensuring information security. Examples of such restrictions include a restriction on users who are permitted to use the apparatus, a restriction on the number of sheets permitted to print, or color modes permitted to use. In addition, from the viewpoint of improving convenience for the users, functional enhancements such as location-free printing and integrated circuit (IC) card authentication are also introduced to such apparatuses.

If such an apparatus is a simple network printer or the like, as long as a user knows basic information such as the model name or the Internet Protocol (IP) address of the apparatus, the user himself/herself can download a device driver from the website of the manufacture, and set up an environment for making the apparatus usable. However, as more functional enhancements described above are introduced, the installation process becomes more complex, because the user needs to set up an environment or install drivers and applications to make such functional enhancements usable. For example, if a use restriction is to be imposed using a user code or a user identification (ID), a user code or a user ID needs to be configured in addition to networking configurations such as an IP address. Furthermore, there are some cases where it is preferable not to make the IP address open, from the viewpoint of ensuring security.

In particular, it is cumbersome for information system administrators in government agencies, companies, and universities to set up initial configurations on each personal computer to be managed, or to ask end-users to perform such configurations. Provided to alleviate such burdens of system administrators are aiding tools for creating an installation package for enabling required applications, drivers, special utilities, and configurations to be installed all at once.

Also known as a technology for aiding the installation process is disclosed in Japanese Patent No. 4340476. In Japanese Patent No. 4340476, a scenario unique to a computer is created by retrieving and acquiring data from installation database, and incorporating the data in a scenario template in which steps of installing software are described. In this manner, installations of device drivers or configurations of the printing environment required for enabling a terminal to use network printing from a printing apparatus can be easily performed to each terminal.

Known as a technology for aiding the user-side installation process is a technology for collecting device information from a printer or an MFP on a network in advance, and allowing a user to download an installation package from a list. Japanese Patent Application Laid-open No. 2003-131976 discloses a technology in which, when a printer is selected from a list on a terminal, connection configurations and printing configurations are performed by acquiring a printer driver corresponding to the printer from a database. Japanese Patent Application Laid-open No. 2005-301608 discloses a technology in which, when a user selects a peripheral device to be installed from a list of peripheral devices, an installer is used to check if the driver is already installed before installing such a driver. Furthermore, Japanese Patent Application Laid-open No. 2000-353079 discloses a technology in which a device driver is automatically updated to the latest release.

As described above, various technologies are known to support installations and configurations of a computer program such as a device driver of a device, or to update a computer program to the latest release. When the aiding tool for creating the installation package is used, although the burdens of the system administrators can be reduced, end-users need to complete the installation process and manage the package appropriately. There are some cases that the end-user cannot find the package distributed in the past when the user is going to use the package because the installation process was incomplete or the user re-installed an operating system (OS), for example.

In the technologies disclosed in Japanese Patent No. 4340476 and Japanese Patent Application Laid-open No. 2005-301608, although a user can download and install a computer program when the user needs the computer program, the user needs to find the exact device the user wants to use from a list or the like. Computer programs may also be organized in a hierarchical structure or retrieved using attribute information such as a building, a floor, or a section in which the apparatus is installed, but there are some cases no attribute information is assigned or devices of the same model are installed in a large number. In a large organization, because an enormous number of devices are installed, it is difficult for a user to find a target device. Furthermore, if a user installs a wrong computer program, the user needs to do an extra work.

Therefore, having been desired is a development of a technology for allowing a computer program for making a target data processing apparatus usable to be installed and configured to a target terminal device through a simple and intuitive process.

SUMMARY OF THE INVENTION

It is an object of the present invention to at least partially solve the problems in the conventional technology.

In consideration of such inconveniences in the conventional technologies, there is needed to provide a data processing apparatus, a computer program, and a data processing system that enables a user to configure initial settings for using a target data processing apparatus to a target information terminal device through a simple operation.

According to the present invention, there is provided a data processing apparatus connected to a network, the data processing apparatus comprising: a receiving unit configured to receive an input of user information; a determining unit configured to determine a destination corresponding to the user information; a preparing unit configured to prepare a computer program for enabling an information terminal device to which the computer program is installed to use a data processing function provided by the data processing apparatus, and configuration information related to the data processing function; and a transmitting unit configured to transmit instruction information giving an instruction as to how the computer program and the configuration information are acquired to the destination thus determined over the network.

The present invention also provides a non-transitory computer-readable recording medium that contains a computer program causing a computer to function as: a receiving unit configured to receive an input of user information; a determining unit configured to determine a destination corresponding to the user information; a preparing unit configured to prepare a computer program for enabling an information terminal device to which the computer program is installed to use a data processing function provided by the data processing apparatus, and configuration information related to the data processing function; and a transmitting unit configured to transmit instruction information giving an instruction as to how the computer program and the configuration information are acquired to the destination thus determined over a network.

The present invention also provides a data processing system comprising: a data processing apparatus; and one or more servers connected to the data processing apparatus over a network.

In the data processing system mentioned above, the data processing apparatus comprises a receiving unit configured to receive an input of user information entered via an input device included in the data processing apparatus, and the one or more server comprises; a determining unit configured to determine a destination corresponding to the user information; a preparing unit configured to prepare a computer program for enabling an information terminal device to which such a computer program is installed to use a data processing function provided by the data processing apparatus, and configuration information related to the data processing function; and a transmitting unit configured to transmit instruction information giving an instruction as to how the computer program and the configuration information are acquired to the destination thus determined over the network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic illustrating an example of a package distribution configuration screen displayed on a display of an operation panel or of an administrator terminal;

FIG. 9 is a schematic illustrating an example of a data structure of user management information;

FIG. 14 is a sequence chart illustrating a process performed between the MFP and a plurality of servers in the image processing system according to the second embodiment when a package distribution request is received.

DETAILED DESCRIPTION OF THE PREFERRED EMBODIMENTS

The present invention will now be explained using some embodiments, although the present invention is not limited to the embodiments described below. In the embodiments described below, a data processing apparatus providing a data processing function is explained using an example of an MFP providing a plurality of image processing functions such as those of a printer, a copier, a scanner, and a facsimile.

First Embodiment

Figure 1:
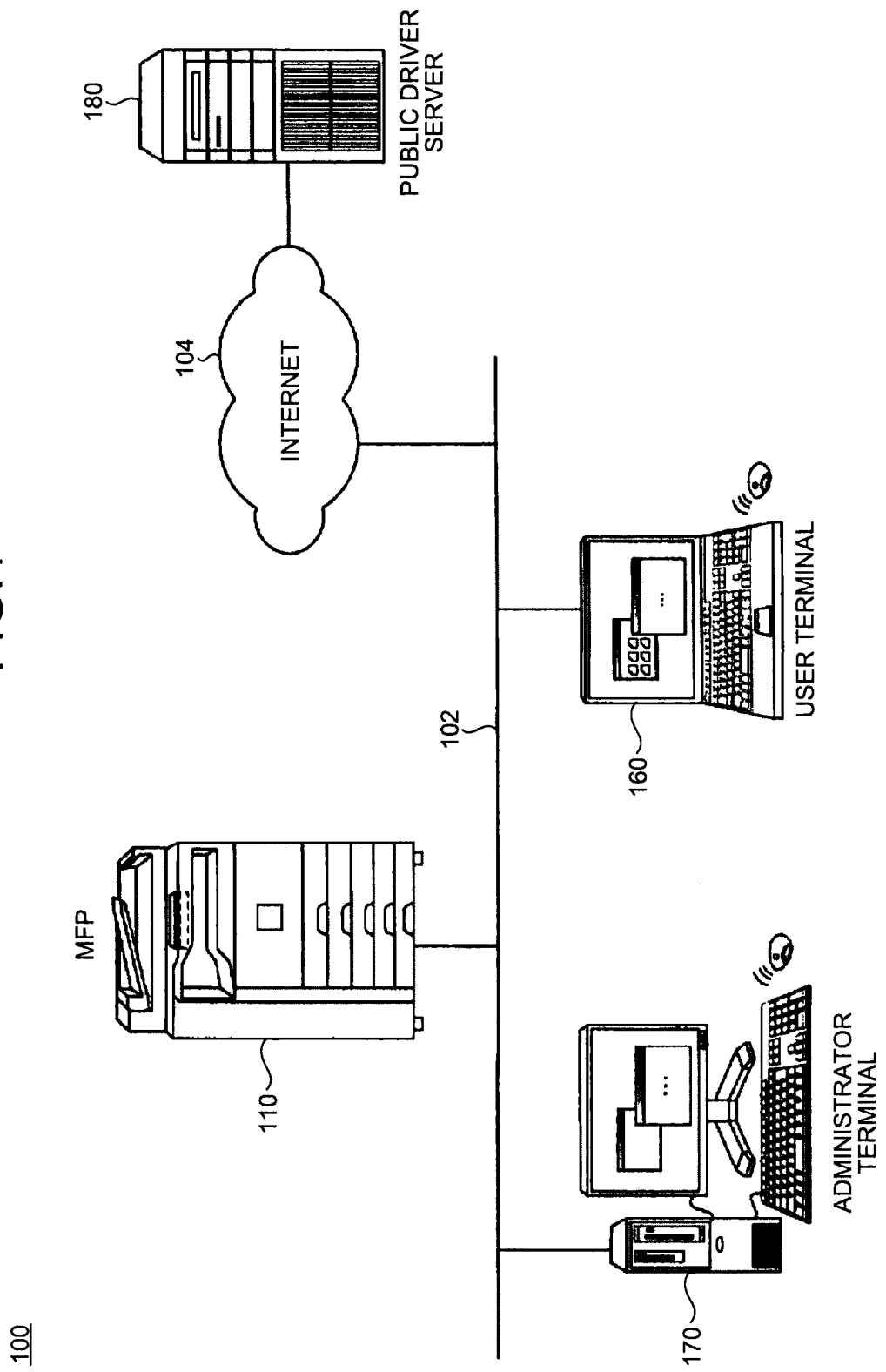
FIG. 1 is a schematic illustrating a network environment in which an MFP according to a first embodiment of the present invention is deployed.

FIG. 1 is a schematic illustrating a network environment in which an MFP according to a first embodiment of the present invention is deployed. A network environment 100 illustrated in FIG. 1 includes an MFP 110, a user terminal 160, and an administrator terminal 170 connected to one another over an internal network 102. The internal network 102 is not especially limited, and may be a wired network, e.g., an Ethernet (registered trademark) network such as a 1000 Base-TX network, or a wireless network based on a standard such as the Institute of Electrical and Electronics Engineers (IEEE) 802.11. The internal network 102 may include a wide area network deployed in a secure environment using a virtual private network (VPN), as well as a local area network (LAN).

The MFP 110 has various image processing functions such as those of a printer, a scanner, and a facsimile, and processes various jobs requested by external information terminal devices over the internal network 102. The user terminal 160 is an information terminal device operated by an end-user (hereinafter, simply referred to as a user) using the MFP 110 as a printer, a scanner, or a facsimile. The user terminal 160 requests various jobs such as a print job, a scan job, and a facsimile transmitting job from the MFP 110 in response to an instruction from a user.

In the first embodiment, device drivers for allowing the image processing functions provided by the MFP 110 to use, as well as other applications and configuration information related to these functions, are provided as an install package (hereinafter, simply referred to as a package). The package, which will be describe in detail later, includes one or more software modules (including device drivers and applications) and configuration information related to such one or more software modules. More preferably, the package is provided as a file in an executable format.

The MFP 110 according to the first embodiment generates the package in response to a user request, and prepares to distribute the package to the user terminal 160. The package is transmitted to a user as an email attachment, or downloadably stored in a storage area that is externally accessible to allow the user to use the package. A user acquires the package using the user terminal 160, and performs a bulk installation and configurations of required software.

To the internal network 102 illustrated in FIG. 1, the Internet 104 is connected via a router not illustrated. Connected to the Internet 104 is a public driver server 180 for providing device drivers supporting models of the MFP 110 publically available. The administrator terminal 170 is an information terminal device operated by an administrator user who performs various configurations to the MFP 110. The MFP 110 includes a remote configuration interface for receiving a remote configuration operation over a network. An administrator user can perform various configurations related to a package distribution by accessing the remote configuration interface from the administrator terminal 170.

Figure 2:
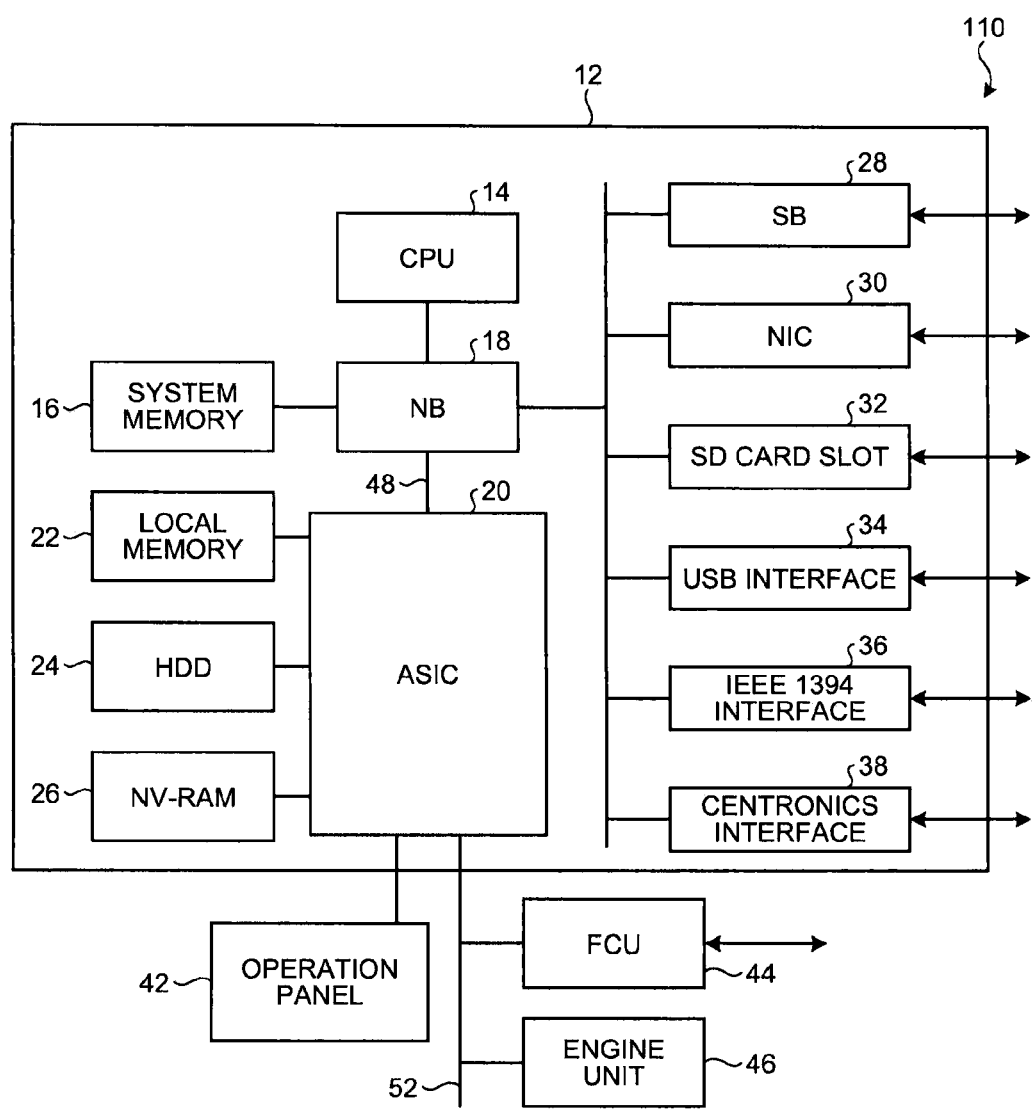
FIG. 2 is a schematic of a hardware configuration of the MFP according to the first embodiment.

A hardware configuration of the MFP according to the first embodiment will now be explained with reference to FIG. 2. The MFP 110 includes a controller 12, an operation panel 42, a facsimile control unit (FCU) 44, and an engine unit 46. The controller 12 includes a central processing unit (CPU) 14, a north bridge (NB) 18, an application specific integrated circuit (ASIC) 20, and a system memory 16. The ASIC 20 executes various types of image processing. The ASIC 20 is connected to the NB 18 via an accelerated graphic port (AGP) 48, and to the CPU 14 via the NB 18. The system memory 16 is used as a drawing memory, for example.

The ASIC 20 is connected to a local memory 22, a hard disk drive (HDD) 24, and a non-volatile memory (NV-RAM) 26 such as a flash memory. The local memory 22 is used as an image buffer for copying, or a coding buffer. The HDD 24 is a storage storing therein image data, document data, computer programs, font data, form data, and the like. The HDD 24 according to the first embodiment provides a storage area for storing therein the package. The NV-RAM 26 stores therein computer programs for controlling the MFP 110, system information, and configuration information related to a package distribution.

The controller 12 further includes a south bridge (SB) 28 connected to the NB 18 via a peripheral component interconnect (PCI) bus 50, a network interface card (NIC) 30, a secure digital (SD) card slot 32, a universal serial bus (USB) interface 34, an IEEE 1394 interface 36, and a Centronics interface 38. The SB 28 is a bridge for connecting the NB 18 to a read-only memory (ROM) not illustrated, a PCI bus peripheral device, and the like. The NIC 30 is an interface device for connecting the MFP 110 to the internal network 102, and receives a job requested over a network. An SD card not illustrated is mounted on the SD card slot 32 removably. The USB interface 34, the IEEE 1394 interface 36, and the Centronics interface 38 are interfaces that are based on respective standards.

The operation panel 42 is connected to the ASIC 20 of the controller 12, and provides a user interface for receiving inputs of various instructions from an operator and for displaying a screen. The operation panel 42 according to the first embodiment functions as an input device receiving user information from a user. The FCU 44 and the engine unit 46 are connected to the ASIC 20 via the PCI bus 50. The FCU 44 executes communications based on a protocol such as that of a facsimile communication standard such as a G3 or G4. The engine unit 46 receives a print job or a scan job issued by the user terminal 160, and executes an image forming process or an image scanning process. The MFP 110 may also include an IC card reader so that IC card authentication is supported.

Each of the user terminal 160 and the administrator terminal 170 is configured as a general-purpose computer such as a personal computer, or an information terminal device, such as a tablet terminal, a smart phone, and a personal digital assistance (PDA). Each of the user terminal 160 and the administrator terminal 170 includes a CPU, a RAM, an HDD or a solid state drive (SSD), an NIC, a display, and an input device such as a mouse, a keyboard, and a touch panel none of which is illustrated.

Figure 3:
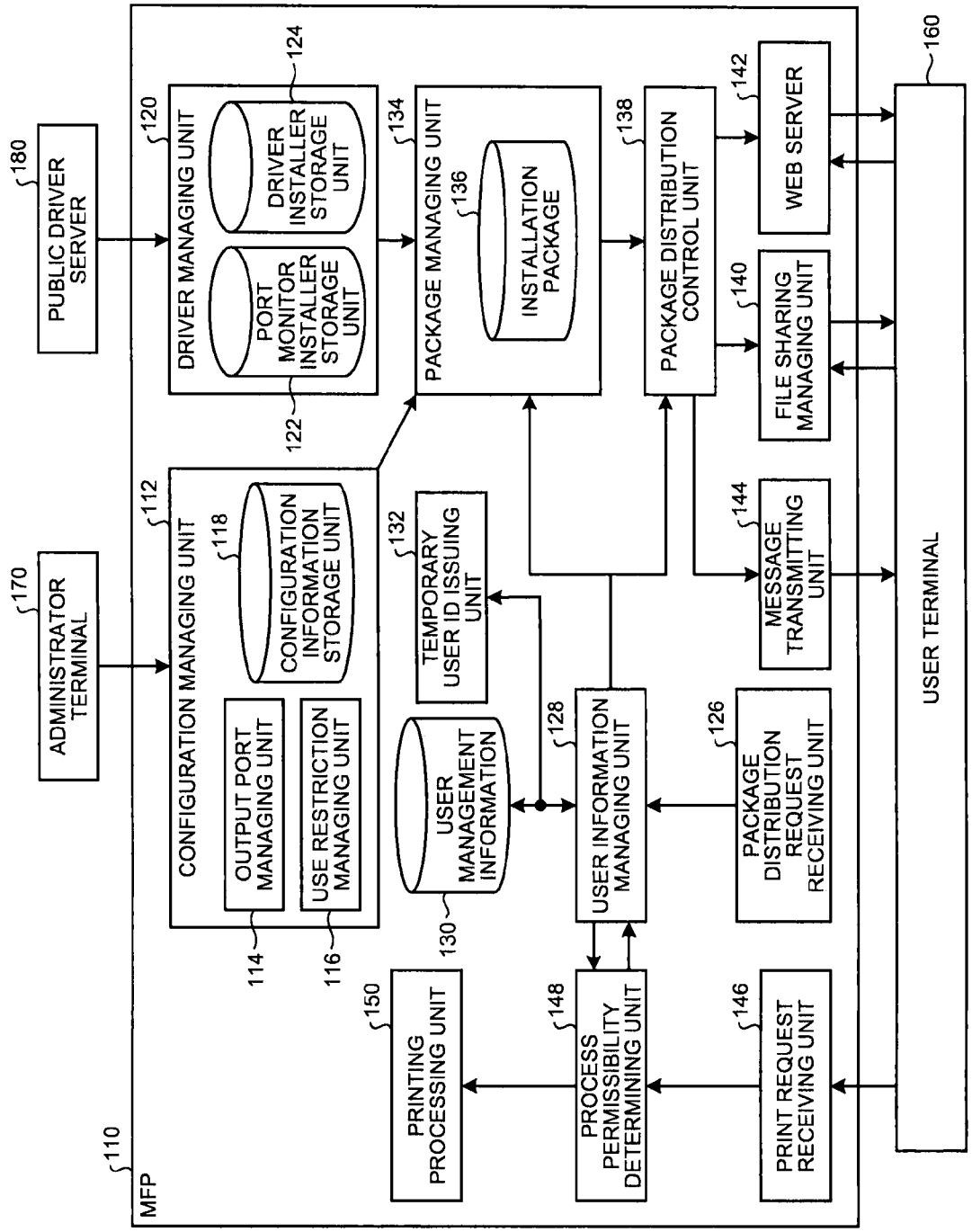
FIG. 3 is a schematic of functional blocks realized on the MFP according to the first embodiment.

A package distributing process according to the first embodiment will now be explained with reference to FIGS. 3 to 11. FIG. 3 is a schematic of functional blocks realized on the MFP 110 according to the first embodiment. In the first embodiment, a user who wants to use the MFP 110 moves in front of the MFP 110, and issues an application indicating that the user wants to use the MFP 110 via the operation panel 42 (hereinafter, referred to as an application for use). The user then returns to his/her user terminal 160, and acquires and installs a package following a message received from the MFP 110. Explained below in the first embodiment are an example in which the data processing function is a print function, and an example in which the package includes a printer driver installer and a port monitor installer.

The MFP 110 illustrated in FIG. 3 includes a configuration managing unit 112, a driver managing unit 120, a package distribution request receiving unit 126, a user information managing unit 128, a package managing unit 134, a package distribution control unit 138, and a message transmitting unit 144.

The configuration managing unit 112 receives various configurations related to a package distribution, and manages configuration information. A configuring operation is performed via the operation panel 42 or the remote configuration interface. More specifically, the configuration managing unit 112 includes an output port managing unit 114, a use restriction managing unit 116, and a configuration information storage unit 118. The output port managing unit 114 manages output port configuration information such as a destination IP address, a protocol, and a port number used when the MFP 110 is used by a user. The destination IP address is an IP address assigned to the MFP 110 in a configuration in which a job is transmitted directly to the MFP 110, and is an IP address of a print server in a configuration in which a job is directed via a print server. The use restriction managing unit 116 manages conditions in a use privilege when a package is distributed to a user. The configuration information storage unit 118 stores therein various types of configuration information managed by the output port managing unit 114 and the use restriction managing unit 116.

The driver managing unit 120 manages files such as a printer driver installer and a port monitor installer required for adding an output port. When there are other applications required to co-operate with an external server, the driver managing unit 120 manages files of other necessary software modules. The software modules are managed for each type of an operating system (OS). A port monitor installer storage unit 122 stores therein a port monitor installer corresponding to each OS type, and a driver installer storage unit 124 stores therein a printer driver installer corresponding to each OS type.

In the public driver server 180 illustrated in FIG. 1, software modules are updated as necessary. In order to keep the software modules to the latest release, the driver managing unit 120 communicates with the public driver server 180 on a regular basis or on an irregular basis in response to an explicit instruction from an administrator user. The driver managing unit 120 checks the version number or the like, and if a software module on the public driver server 180 is updated, the driver managing unit 120 downloads the update file for each OS type, and stores the update files in the storage units 122 and 124.

The package distribution request receiving unit 126 is a receiving unit that receives an application for use, information of an OS used, and user information input via an input device included in the MFP 110. Examples of user information input via the input device include a user ID for uniquely identifying a user, and a unique email address assigned to the user. Examples of the input device include the operation panel 42 and the IC card reader not illustrated.

The user information managing unit 128 manages user management information 130 that maintains information related to registered users. The user information managing unit 128 checks if an application for use is submitted by a registered user based on the received user information by referring to the user management information 130. When an email address is received as the user information and information corresponding to the email address is registered in the user management information 130, the user information managing unit 128 acquires the user ID of the registered user.

For a registered user, the user information managing unit 128 also determines the destination of a message by acquiring an email address linked to the entered user ID or an IC card, or using the input email address as it is. When a plurality of email addresses are registered, the MFP 110 may select or ask the user to select one of the email addresses.

In the first embodiment explained below, the user management information 130 is explained to be managed as an address book in the MFP 110, for example. However, in other embodiments, the user management information 130 may be stored in an external user management server such as a lightweight directory access protocol (LDAP) server, and the destination may be determined by issuing an inquiry to the user management server. The user information managing unit 128 is configured as a determining unit in the first embodiment.

The MFP 110 may also include a temporary user ID issuing unit 132 so as to allow a user other than the authorized registered users to use the functions of the MFP 110. The temporary user ID issuing unit 132 is an identification information issuing unit that issues a temporary user ID when an application for use is issued by a user other than the authorized registered users. A temporary user ID is numbered so that such a number does not become redundant with (temporary) user ID having already issued. When an unauthorized user submits an application for use, the user is required to enter his/her email address. Therefore, the user information managing unit 128 determines the email address thus entered as the destination of the message as it is.

To a temporary user ID, a restriction is imposed to at least one of the length of time for which and the quantity by which the MFP 110 is permitted to use, and which the functions of the MFP 110 is permitted to use. The configuration information of whether a temporary use is permitted, or, if permitted, what kind of use restriction is imposed is managed by the use restriction managing unit 116 in the configuration managing unit 112. A unique value may be generated as the temporary user ID every time such an identification is issued, or re-use an identification having issued and having already expired.

In response to an application for use, the package managing unit 134 reads the configuration information from the configuration managing unit 112 and reads the port monitor installer and the driver installer corresponding to the OS to be used from the driver managing unit 120, and generates an installation package 136. The package managing unit 134 can also prepare a package unique to the user by acquiring user ID from the user information managing unit 128 and embedding the user ID to the package. The package managing unit 134 functions as a preparing unit in the first embodiment.

In the embodiments explained herein, the user ID used in acquiring the email address and the user ID embedded in the package are explained using the same terminology, but may be different. The user ID may be any information identifying a user, such as an employee number, an account ID, or a user code consisting of a given number of alpha-numeric characters.

The package distribution control unit 138 is a distribution control unit that controls a distribution of the package 136 prepared in the manner described above. In the first embodiment, the package can be distributed via a selection from a plurality of routes. A first route is a route for distributing the package via a web server. A second route is a route for distributing the package via a file sharing service. A third route is a route for distributing the package as an email attachment. A route for distributing the package via a file transfer protocol (FTP) server may be provided additionally, although a detailed explanation thereof is omitted herein.

When the first route is selected, the package distribution control unit 138 stores the package in a web server 142 implemented on the MFP 110 in a downloadable manner. When the second route is selected, the package distribution control unit 138 stores the package in a shared folder that can be accessed over a network. A file sharing managing unit 140 implements file sharing protocols such as the Server Message Block (SMB) and the Common Internet File System (CIFS), and manages the shared folder.

The package is preferably acquired or executed only by specific users. Therefore, when the first route or the second route is selected, the package distribution control unit 138 works in cooperation with the user information managing unit 128 to store therein the package in a manner secured by any one of access control and password protection or both.

The access control in the first route can be realized by issuing a user-specific download uniform resource locator (URL). Alternatively, a user may be requested to be authenticated when the package is to be downloaded, or a link for a download page may be embedded in a user-specific web page accessed after the user is authenticated. The access control in the second route may be realized by controlling the right to access the shared folder. An account used for the user authentication or the access right control may be the same as or different from the user ID embedded in the package. The password protection can be realized by compressing the package in a manner protected with a password.

Preferably, when downloading of the package to the user terminal 160 is completed or when a preconfigured release period has ended, the package is made inaccessible by deleting the package, disabling the download URL, or changing the access right. Completion of downloading can be determined by monitoring an access log of the shared folder, or detecting a disconnection of a download session, for example. Alternatively, completion of installation may be detected by detecting a first job issued by a user-specific driver and deleted.

The message transmitting unit 144 is a transmitting unit that transmits a message for giving an instruction as to how the user can acquire the package to the email address determined as the destination over the internal network 102. When the first route or the second route is selected, the instruction message includes at least one email message including a download URL indicating where the package is stored or a path (URL) to the shared file. When the package is secured by access control or password protection, the instruction message includes at least one email message on which an access ID and a password are provided.

The access ID and the password may be provided in the email message on which the URL is provided, but more preferably, provided in a separate email message. Therefore, the instruction message may include two or more email messages. In the embodiments explained herein, the instruction message is explained to be an email message, but in other embodiments, the message may be provided via any message distribution system, such as an instant message, enabled to communicate the URL to the user.

When the third route is selected, the message transmitting unit 144 transmits an email message to which the package is attached, as an instruction message. Because sometimes a capacity limit is imposed on an email address, an upper limit may be provided to the size of the package for which the third route can be selected, for example.

When the user returns in front of the user terminal 160, and receives the instruction message transmitted from the MFP 110, the user is now ready for acquiring the package. In the case of the first route, the package can be downloaded from the link embedded in the instruction message. In the case of the second route, the user can access the path provided in the instruction email, and copy or move the package to the user terminal 160. In the case of the third route, the package is acquired by storing the file attached to the instruction email.

Figure 4:
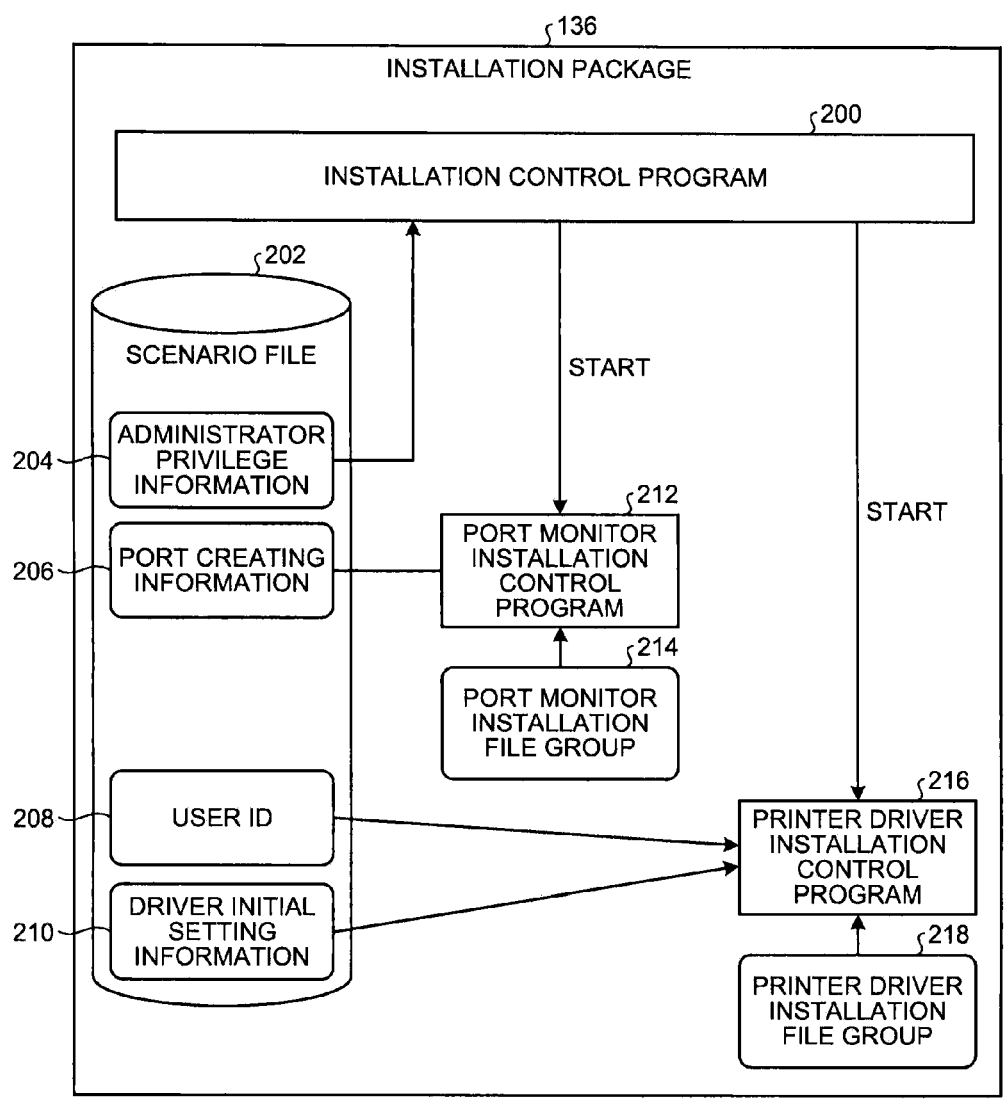
FIG. 4 is a schematic of a data structure of a package prepared and distributed by the MFP according to the first embodiment.

FIG. 4 is a schematic of a data structure of a package prepared and distributed by the MFP 110 according to the first embodiment. The package 136 illustrated in FIG. 4 includes an installation control program 200, a scenario file 202, a port monitor installation control program 212, a port monitor installation file group 214, a printer driver installation control program 216, and a printer driver installation file group 218.

The scenario file 202 is configuration information in which installation conditions are described, and an installation operation is controlled following the descriptions in the scenario file 202. An administrator user can specify what is described in the scenario file 202 included in the package via the configuration managing unit 112. In this manner, even when an installation environment is changed, a user can install the package correctly without being aware of the change. More specifically, the scenario file 202 includes administrator privilege information 204, port creating information 206, a user ID 208, and driver initial setting information 210.

The administrator privilege information 204 is information in which an administrator account and a password are encrypted. In a Windows (registered trademark) environment, there are some cases where a general user is prohibited from installing the package because writing to a system folder by a general user is prohibited by an access control. In such a case, the administrator privilege information 204 promotes an installer process to a process with an administrator privilege so that the installation process can be completed with an administrator privilege. When the user terminal 160 is managed by a domain controller, a domain administrator account and a password may be configured to the administrator privilege information 204.

The port creating information 206 is information including networking information such as a destination Transmission Control Protocol/Internet Protocol (TCP/IP) address and port number, and describing which port the printer driver is assigned. When the port is a proprietary port, a monitor for the proprietary port is installed simultaneously with the printer driver. The user ID 208 is a parameter for imposing a restriction on at least one of the length of time for which and the quantity by which the MFP 110 is permitted to use, and which the functions of the MFP 110 is permitted to use. The driver initial setting information 210 is used to re-write a default setting of the printer driver. For example, when it is desired to set monochromatic printing to a color printer as a default setting, monochromatic mode is set as an initial value.

The installation control program 200 is a computer program that controls the entire process of the package installation process, and performs the installation process following the descriptions in the scenario file 202. The port monitor installation file group 214 is a group of files that are used in installing the proprietary port monitor. The printer driver installation file group 218 is a group of files used in installing the printer driver. The installation control program 200 causes the port monitor installation control program 212 to start, and to install the port monitor using the file group 214 before the printer driver is installed. The installation control program 200 causes the printer driver installation control program 216 to start, and to install the printer driver using the file group 218. When the driver or the port monitor is updated, these file groups are replaced.

When a user issues an instruction for executing the package on the user terminal 160, the installation control program 200 is started, and the port monitor and the printer driver installing processes and the configuring process are then executed. When the installations are completed, the user can request a print job from the MFP 110 on the user terminal 160.

Referring back to FIG. 3, the MFP 110 also includes a print request receiving unit 146, a process permissibility determining unit 148, and a printing processing unit 150. The print request receiving unit 146 receives a print job from the user terminal 160 via the printer driver. The user ID embedded in the package is appended to the print job. The process permissibility determining unit 148 acquires the user ID included in the print job, and inquires of the user information managing unit 128 about a use restriction imposed on the user ID, and determines if processing of the print job is permitted. When the validity specified to the user ID has been expired, or when the upper limit of the use quantity restriction has reached for a function on which the restriction is imposed, the process permissibility determining unit 148 determines that processing of such a print job is not permitted.

The printing processing unit 150 executes a print outputting process for the print job based on the determination result made by the process permissibility determining unit 148. When the process permissibility determining unit 148 determines that processing of the print job is not permitted, the process permissibility determining unit 148 notifies of the requesting user terminal 160 an error. Instead of notifying the user terminal 160 an error, the printing output may be continued by applying a change, for example, changing color printing to monochromatic printing when a color printing is restricted while monochromatic printing is not.

Figure 5:
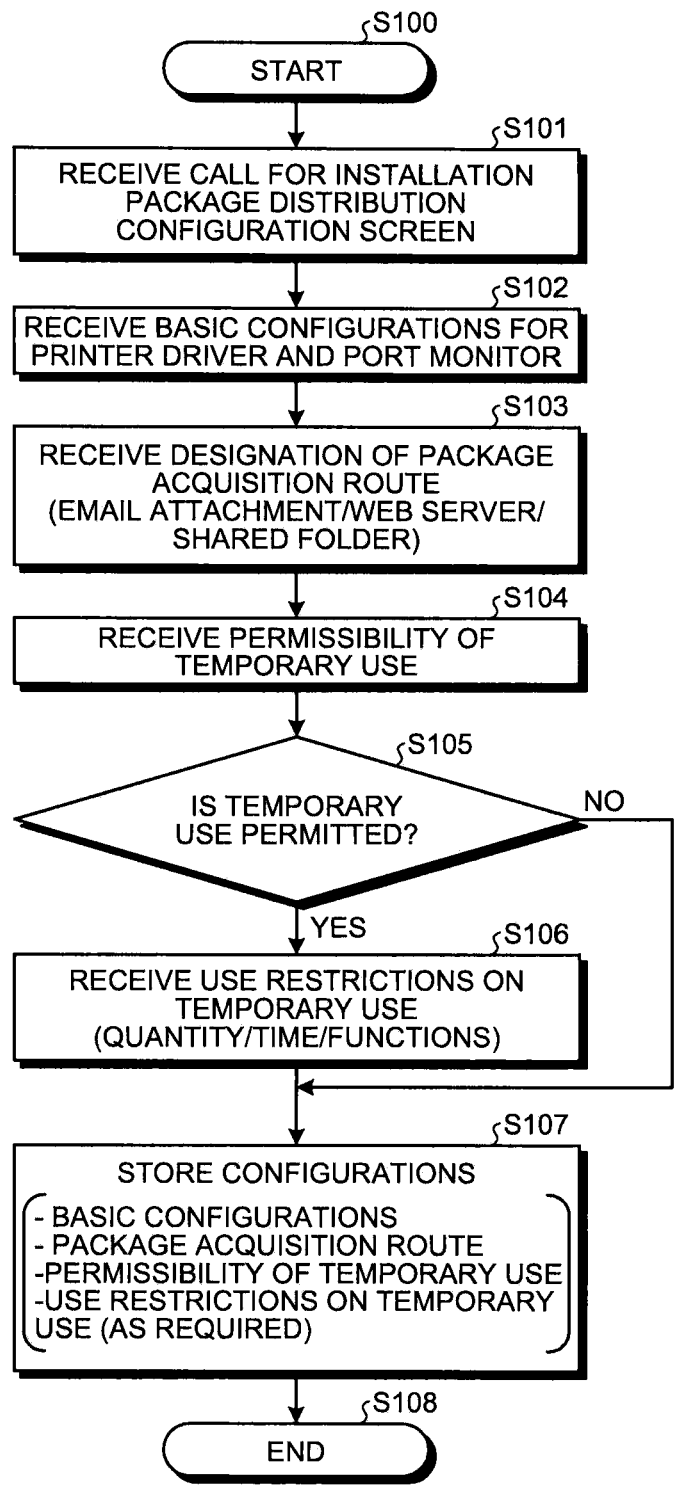
FIG. 5 is a flowchart illustrating a package distribution configuring process performed by the MFP according to the first embodiment.

Configuring a package distribution according to the first embodiment will now be explained more in detail with reference to FIGS. 5 and 6. FIG. 5 is a flowchart illustrating a package distribution configuring process performed by the MFP according to the first embodiment. FIG. 6 is a schematic illustrating an example of a package distribution configuration screen displayed on the display of the operation panel 42 or on the administrator terminal 170.

The process illustrated in FIG. 5 starts at Step S100. At Step S101, the configuration managing unit 112 receives a call for the package distribution configuration screen. At Step S102, the configuration managing unit 112 displays a basic settings screen of the package distribution configuration screen, and receives basic configurations of the package, such as those for the printer driver and the port monitor. The basic configuration includes the administrator privilege information 204, the port creating information 206, a designation of whether the user ID 208 is required to be embedded, and the driver initial setting information 210, illustrated in FIG. 4.

When basic configurations are completed, a distribution settings screen 220 for setting package distribution configurations is displayed, as illustrated in FIG. 6. At Step S103, the configuration managing unit 112 receives a designation of a package acquisition route. The distribution settings screen 220 illustrated in FIG. 6 displays radio buttons including an alternative 224a for "acquire as email attachment (the third route)", an alternative 224b for "acquire from web server (the first route)", and an alternative 224c for "acquire from shared folder (the second route)" under a configuration item 222 indicating package acquisition routes, and one of the three routes is selected.

At Step S104, the configuration managing unit 112 receives a designation as to whether temporary use is permitted. In the distribution settings screen 220 illustrated in FIG. 6, permissibility of temporary use is selected using radio buttons 228a and 228b under a configuration item 226. At Step S105, the process is branched based on the permissibility of temporary use. When "permit" is specified for the temporary use at Step S105 (Yes), the process goes to Step S106.

Graphical user interface (GUI) components 230 to 238 are enabled when the "permit" alternative 228a is selected, for example. At Step S106, the configuration managing unit 112 receives configurations related to a restriction imposed on temporary use, via the GUI components 230 to 238. As illustrated in FIG. 6, the distribution settings screen 220 may include a pull-down list 230 for imposing a restriction to a length of time for which the use of the MFP 110 is permitted. The pull-down list 230 lists alternatives, e.g., "two hours", "24 hours", and "48 hours", indicating length of time for which temporary use is permitted. By imposing a restriction on a length of time for which a temporary use is permitted, a temporary user can be prevented from keeping using the MFP 110 indefinitely.

The distribution settings screen 220 may include a pull-down list 232 for setting a restriction imposed on the quantity permitted to use, and a use unit setting button 234 for calling a use unit weighting setting in the quantity restriction. The pull-down list 232 lists alternatives of an upper limit to the quantity restriction permitted for temporary use, e.g., "50 use units" or "100 use units". A use unit means a value incremented every time a print process for one page is executed. By pressing the use unit setting button 234, the use unit can be weighted depending on a printing condition. For example, an administrator can specify the use unit any way, e.g. monochromatic printing of a single A4 page corresponds to one use unit, a single A3 page monochromatic printing corresponds to two use units, and a single A3 page color printing corresponds to five use units. For example, when "100 use units" are specified, 20 sheets of A3 page color printing can be printed.

By imposing a restriction on the quantity permitted to a temporary user, the MFP 110 can be prevented from being used temporarily without any limitation.

The distribution settings screen 220 may also include a pull-down list 236 for setting an operation when the upper limit is reached. When the upper limit is reached while executing printing, the printing process may be stopped immediately, or printing output is allowed to be continued only for the current job. Alternatively, only an alarm may be transmitted to the printer driver on the user terminal 160, without changing or interrupting the printing process itself.

The pull-down list 236 lists alternatives of operations performed when the upper limit is reached during a printing operation, such as "apply restriction after current job is completed", "interrupt job", and "permit continuous use". When "apply restriction after current job is completed" is selected, an alarm is issued when the upper limit is exceeded, and the current job is continued, but printing of any subsequent job is not permitted. When "interrupt job" is selected, even the current job is interrupted when the upper limit is exceeded. In the case of the "permit continuous use", an alarm is issued when the upper limit is exceeded, but execution of the job is still continued subsequently.

The distribution settings screen 220 may further include check boxes 238a and 238b for setting functions to be restricted. The check boxes 238a and 238b designate if a restriction is imposed on monochromatic printing and color printing, respectively. For example, when the "color" check box 238b is checked, color printing is interrupted in the situation explained above.

Referring back to FIG. 5, at Step S107, in response to a pressing operation on a set button 240 illustrated in FIG. 6, the configuration managing unit 112 stores the configurations set in the processes at Step S102 to Step S106 in the configuration information storage unit 118, and the process is ended at Step S108. When no temporary use is permitted at Step S105 (No), the process goes directly to Step S107. When an alternative 228b "Do not permit" is selected, the GUI components 230 to 238 are disabled and grayed out.

When a cancel button 242 illustrated in FIG. 6 is pressed down, the process is ended without setting anything, for example. If a return button 244 is pressed down, the basic configurations are received again at Step S102.

Figure 7:
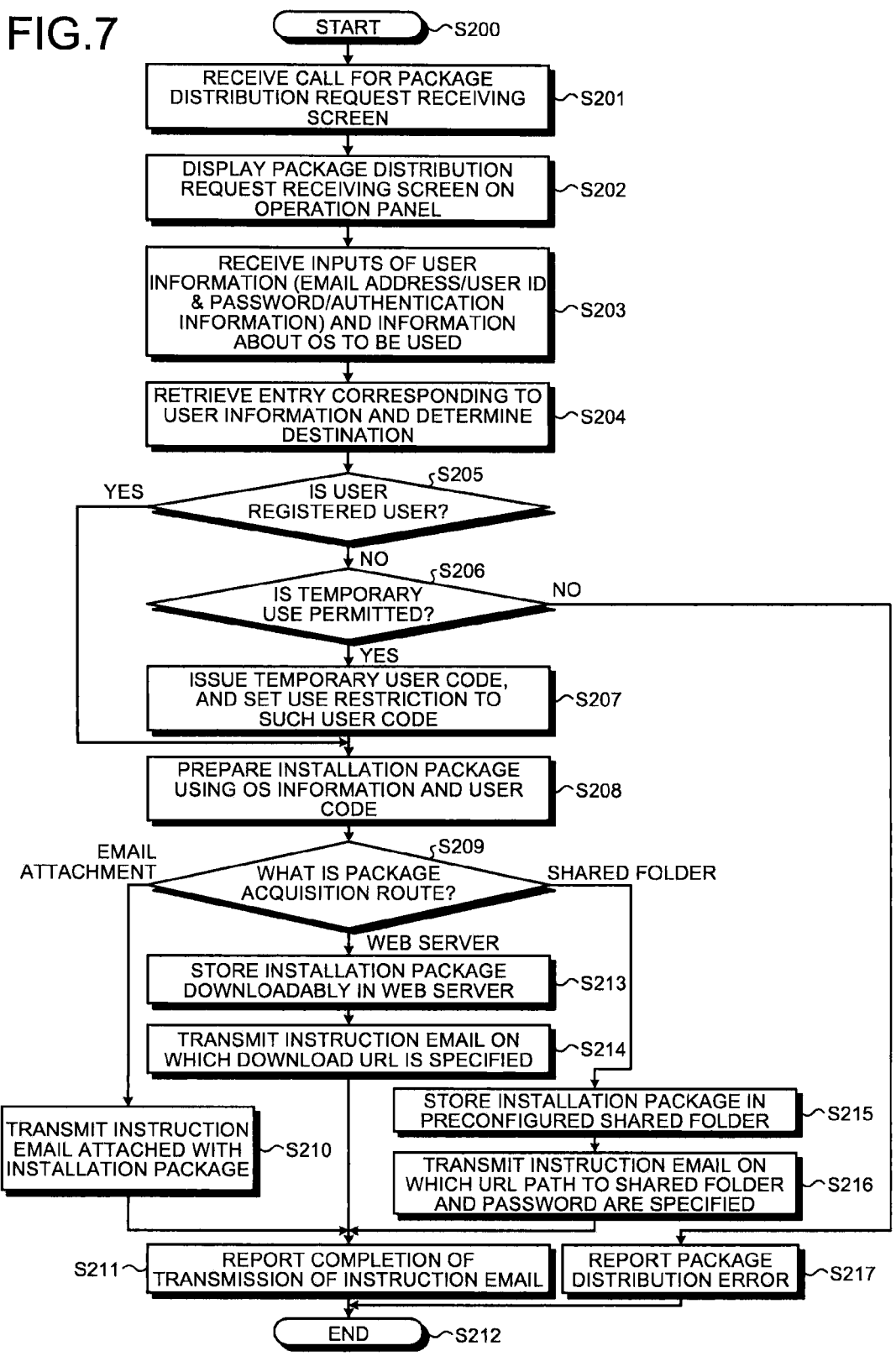
FIG. 7 is a flowchart illustrating a process performed by the MFP according to the first embodiment when a user is to receive a package distribution.
Figure 8:
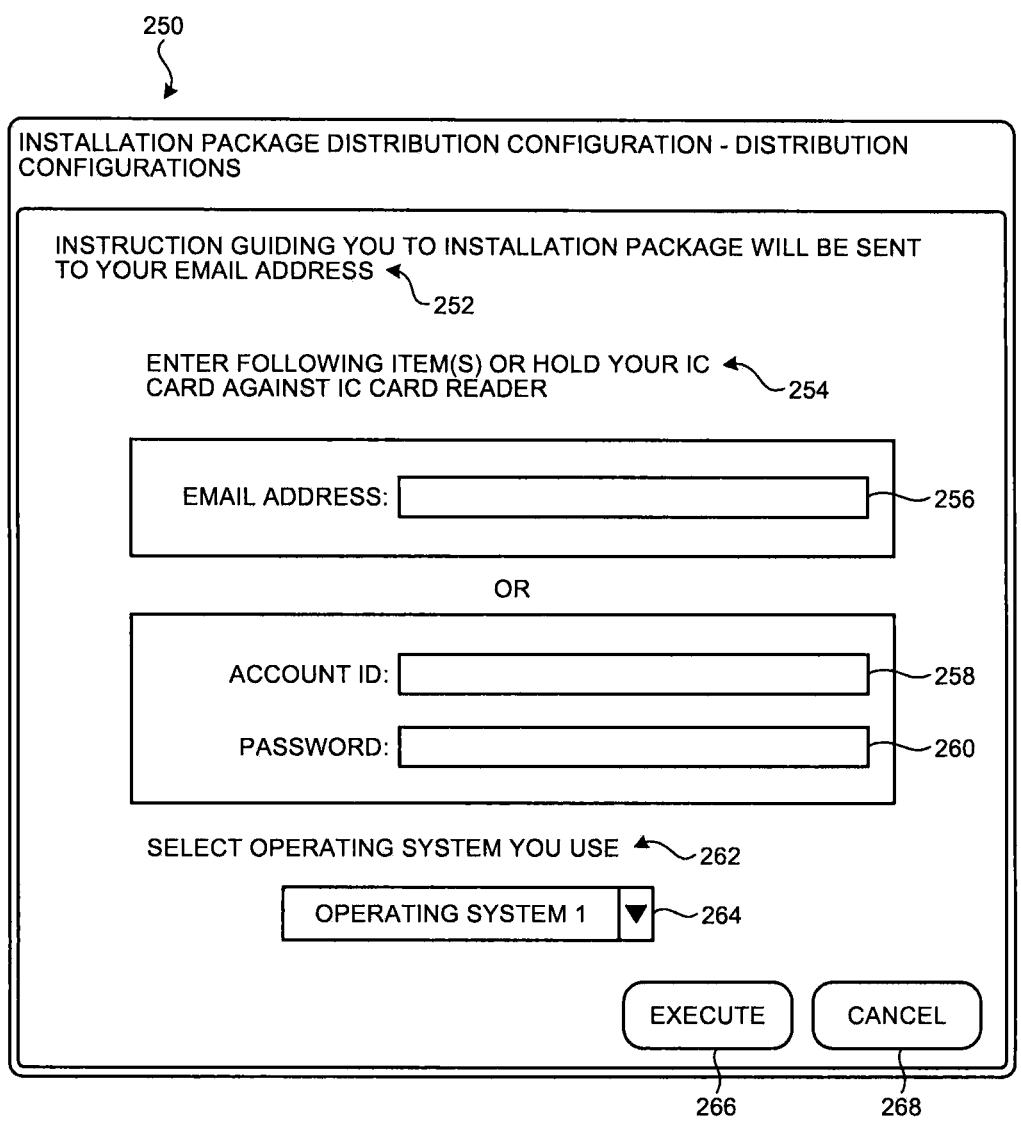
FIG. 8 is a schematic illustrating an example of a package distribution request receiving screen displayed on the display of the operation panel.

A process of receiving a package distribution in the first embodiment will now be explained more in detail with reference to FIGS. 7 to 9. FIG. 7 is a flowchart illustrating a process performed by the MFP according to the first embodiment when a user is to receive a package distribution. FIG. 8 is a schematic illustrating an example of a package distribution request receiving screen displayed on the display of the operation panel 42. FIG. 9 is a schematic illustrating an example of a data structure of the user management information 130.

The process illustrated in FIG. 7 starts at Step S200. At Step S201, the package distribution request receiving unit 126 receives a call for the package distribution request receiving screen via a pressing operation on a hard key of the operation panel 42 or a navigation on the touch panel. At Step S202, the package distribution request receiving unit 126 displays package distribution request receiving screen as illustrated in FIG. 8 on the display of the operation panel 42.

A package distribution request receiving screen 250 illustrated in FIG. 8 includes a message 252 explaining the intention of the request receiving screen, a message 254 for asking a user to enter user information, and GUI components 256 to 260 for receiving user information settings. Examples of the GUI components for setting user information include a text box 256 for entering an email address, and text boxes 258 and 260 for entering an account ID and a password. In this example, an account ID is used as a user ID for acquiring an email address. The distribution receiving screen 250 also includes a message 262 for asking a user to select an OS to be used, a pull-down list 264 for receiving a selection of an OS, an execute button 266, and a cancel button 268. When an email address is entered, when an account ID and a password are entered, or when an IC card is held against the IC card reader, the execute button 266 is activated.

Referring back to FIG. 7, at Step S203, in response to the execute button 266 being touched, the package distribution request receiving unit 126 receives the user information and information about the OS used by the user entered via the distribution receiving screen 250. At Step S204, the user information managing unit 128 uses the email address thus entered, the user ID and the password thus entered, or IC card authentication information thus entered to retrieve a corresponding entry from the user management information 130, and determines a destination.

As illustrated in FIG. 9, the user management information 130 includes a user code field 130a, an account ID field 130b, a user name field 130c, an email address field 130d, a use restriction field 130e, and a field 130f for specifying if the user is an authorized user. At Step S204, when the account ID and the password are entered or when the IC card authentication information is entered, the email address linked to the account ID of the authenticated user is acquired as it is, and determined as the destination address. When an email address is entered, the email address is determined as the destination address.

At Step S205, the user information managing unit 128 determines if the user is an authorized registered user. If no corresponding record is found in the user management information 130, the user information managing unit 128 determines that the user is not a registered user. When the user is determined not to be an authorized registered user at Step S205 (No), the process goes to Step S206. At Step S206, the user information managing unit 128 determines if the temporary use is permitted. At Step S206, if the user information managing unit 128 determines that the temporary use is permitted (Yes), the process goes to Step S207.

At Step S207, the temporary user ID issuing unit 132 issues a temporary user ID, and sets a use restriction conditioned in the manner described above to the user ID. In this example, a user code is issued as a user ID to be embedded in the package. In the user management information 130 illustrated in FIG. 9, when the temporary user ID is issued, a record "user code=T0000001", for example, is registered. At Step S208, the package managing unit 134 prepares the package using the information about the OS used by the user and the user code. By contrast, if the user is determined as a registered user at Step S205 (Yes), the process is directly branched to Step S208. In this case, the user code linked to the registered user is embedded in the package.

At Step S209, the package distribution control unit 138 branches the process depending on the package acquisition route configured. If an email attachment is configured as the package acquisition route, the process is branched from Step S209 to Step S210. At Step S210, the message transmitting unit 144 transmits an instruction email attached with the package prepared in the manner described above to the email address determined as the destination. At Step S211, the MFP 110 displays a report of completion of the instruction email transmission on the operation panel 42, and the process is ended at Step S212.

If a web server is configured as the package acquisition route, the process is branched from Step S209 to Step S213. At Step S213, the package distribution control unit 138 stores the package in the web server 142 in a downloadable manner, and issues a download URL to the package. At Step S214, the message transmitting unit 144 transmits an instruction message specifying the download URL to the email address determined in the manner described above. At Step S211, the MFP 110 displays a report of completion of the instruction email transmission on the operation panel 42, and the process is ended at Step S212.

If file sharing is configured as the package acquisition route, the process is branched from Step S209 to Step S215. At Step S215, the package distribution control unit 138 causes the file sharing managing unit 140 to store the package in the shared folder. At Step S216, the message transmitting unit 144 transmits an instruction message on which the path (URL) to the package in the shared folder is specified to the email address determined in the manner described above, and at Step S211, the MFP 110 displays a report of completion of the transmission, and the process is ended at Step S212.

Referring back to Step S206, if the user information managing unit 128 determines that temporary use is not permitted (No), the process is branched to Step S217. At Step S217, the MFP 110 displays a report of a package distribution error on the operation panel 42, and the process is ended at Step S212.

Figure 10A:
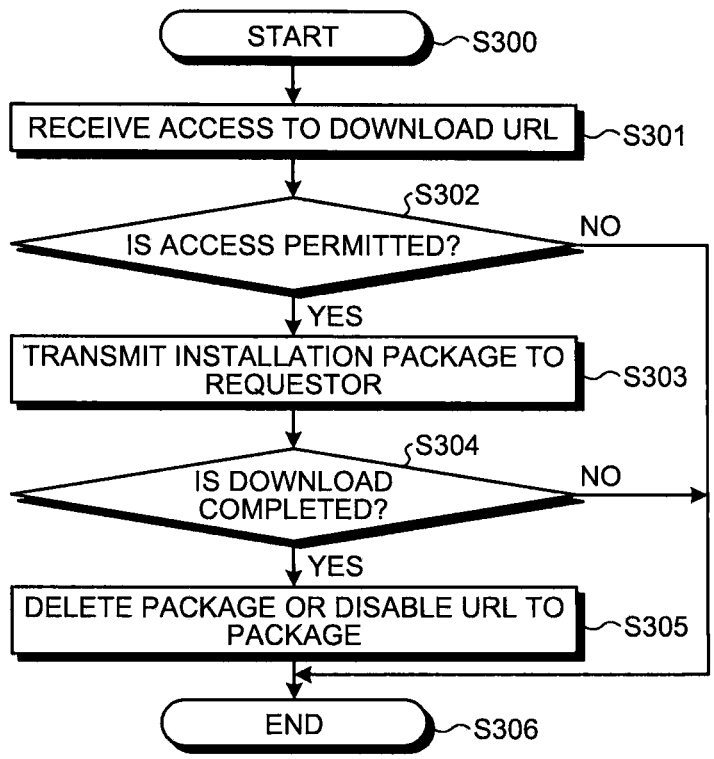
FIGS. 10A and 10B are flowcharts illustrating processes performed by the MFP according to the first embodiment after the package is prepared.
Figure 10B:
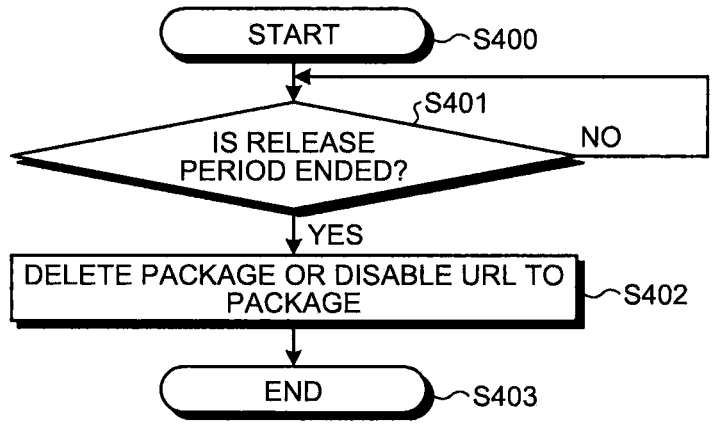

FIGS. 10A and 10B are flowcharts illustrating processes performed by the MFP according to the first embodiment after the package is prepared. The processes illustrated in FIGS. 10A and 10B are processes performed when a web server is selected as the package acquisition route. FIG. 10A is a flowchart illustrating a process performed when the user is to acquire the package. The process illustrated in FIG. 10A starts at Step S300. At Step S301, the web server 142 receives an access to the download URL from the user terminal 160. At Step S302, the web server 142 determines if the access is permitted. If the access is permitted at Step S302 (Yes), the process goes to Step S303.

At Step S303, the web server 142 transmits the package to the requestor in response to the access request to the download URL. At Step S304, the web server 142 determines if a completion of the download is detected based on whether the file transmission is ended and the download session is disconnected, for example. If the web server 142 determines that the download is completed at Step S304 (Yes), the process is branched to Step S305. At Step S305, the web server 142 deletes the package having downloaded or disables the download URL, and the process is ended at Step S306. If the access is not permitted at Step S302 (No), or if the web server 142 determines that the download failed at Step S304 (No), the process is branched to Step S306, and the process is ended.

FIG. 10B is a flowchart illustrating a process of controlling a release period after the package is prepared. The process illustrated in FIG. 10B is performed in response to the completion of the package preparation, and starts at Step S400. At Step S401, the web server 142 determines if the preset release period has ended, and Step S401 is looped until the preset release period has ended (while No at Step S401). When the web server 142 determines that the release period has ended at Step S401 (Yes), the process goes to Step S402. At Step S402, the web server 142 deletes the package having downloaded or disables the download URL, and the process is ended at Step S403.

As explained with reference to FIGS. 10A and 10B, by invalidating the package having downloaded or for which the release period has ended, the package is prevented from being kept released carelessly. Furthermore, by deleting the package having downloaded, the consumed disk capacity in the MFP 110 can be reduced. Furthermore, in the first embodiment explained above, the package is prepared when the package distribution request is received. However, from the viewpoint of reducing the consumed disk capacity, preferably, the package generating process may be suspended when the package distribution request is received, and the package generating process may be executed when the package is to be acquired. Furthermore, it should be needless to say that invalidating the package having downloaded or for which the release period is ended also is applicable to file sharing.

Figure 11:
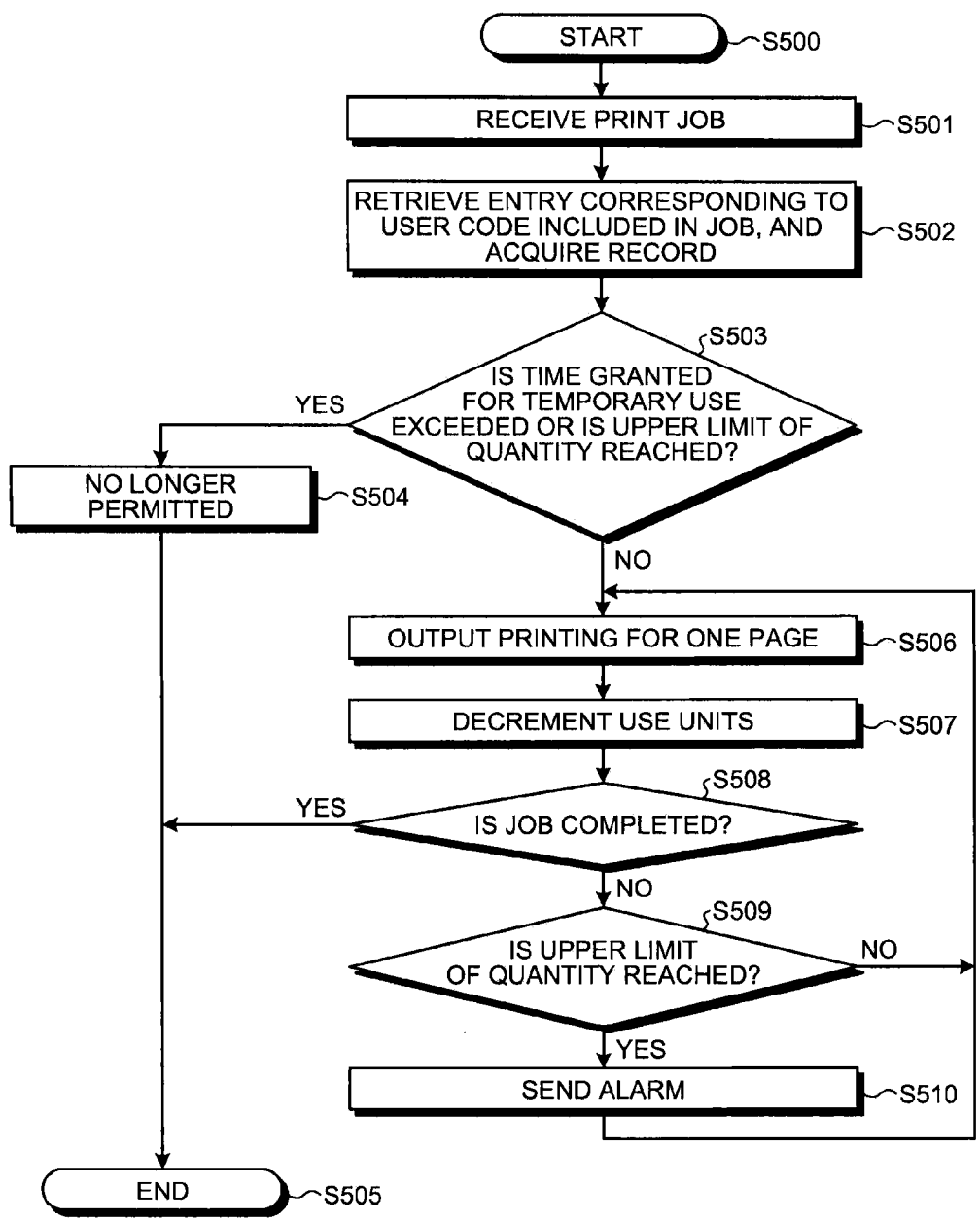
FIG. 11 is a flowchart illustrating a process performed by the MFP according to the first embodiment when a print job is received.

FIG. 11 is a flowchart illustrating a process performed by the MFP according to the first embodiment when a print job is received. The operation illustrated in FIG. 11 is an example in which "apply restriction after current job is completed" is selected. The process illustrated in FIG. 11 starts at Step S500. At Step S501, the print request receiving unit 146 receives a print job issued by the user terminal 160. At Step S502, the process permissibility determining unit 148 inquires the user information managing unit 128, retrieves an entry corresponding to the user code included in the job from the entries in the user management information 130, and acquires the record.

At Step S503, the process permissibility determining unit 148 determines if the time granted for temporary use is exceeded or the upper limit of the quantity permitted to print is reached based on the descriptions in the use restriction field 130e. If the process permissibility determining unit 148 determines that the granted time has been used up or the upper limit is reached at Step S503 (Yes), the process is branched to Step S504. At Step S504, the process permissibility determining unit 148 notifies of the user terminal 160 an error indicating that execution of the print job is not permitted, and the process is ended at Step S505.

If the process permissibility determining unit 148 determines that the granted time is not exceeded and the upper limit of the quantity is not reached at Step S503 (No), the process is branched to Step S506. At Step S506, the printing processing unit 150 makes a printing output for one page, and decrements the use units at given weighting at Step S507. At Step S508, the printing processing unit 150 determines if the process for the requested print job is completed. If the printing processing unit 150 determines that the job is completed at Step S508 (Yes), the process goes to Step S505, and the process is ended.

If the process permissibility determining unit 148 determines that job is incomplete at Step S508 (No), the process is branched to Step S509. At Step S509, the process permissibility determining unit 148 further determines that the upper limit of the granted quantity is reached as a result of decrementing the use units. If the process permissibility determining unit 148 determines that the upper limit is reached at Step S509 (Yes), the process goes to Step S510. At Step S510, the process permissibility determining unit 148 transmits an alarming message to the driver on the user terminal 160, and the process is looped to Step S506. By contrast, if the process permissibility determining unit 148 determines that the upper limit is not reached at Step S509 (No), the process is directly looped to Step S506.

In the first embodiment explained above, a user who wants to use the MFP 110 moves in front of the MFP 110, and issues an application for use and enters user information via the operation panel 42. The user then returns to his/her user terminal 160, receives the instruction message received from the MFP 110, and acquires the package following the instruction message. The user then can complete preparing to use the printing function of the MFP 110 from the user terminal 160 by starting the package. Therefore, the user can use the functions of the MFP the user wants to use from a terminal the user wants to use on demand, through simple operations.

Furthermore, in order to distribute the package in the manner described above, an administrator does not need to keep information of a list of devices connected to the network, and a user does not need to go through a trouble of finding a target MFP from the list information. Furthermore, because a temporary user ID is issued, an administrator can recognize which users are using what, use of the MFP can be managed easily even when a user who is not an authorized registered user suddenly comes in with a request to use the MFP. Furthermore, the administrator can easily invoice the amount used by such a temporary user to a department to which the user belongs. Furthermore, use by such a temporary user can be traced.

Figure 12:
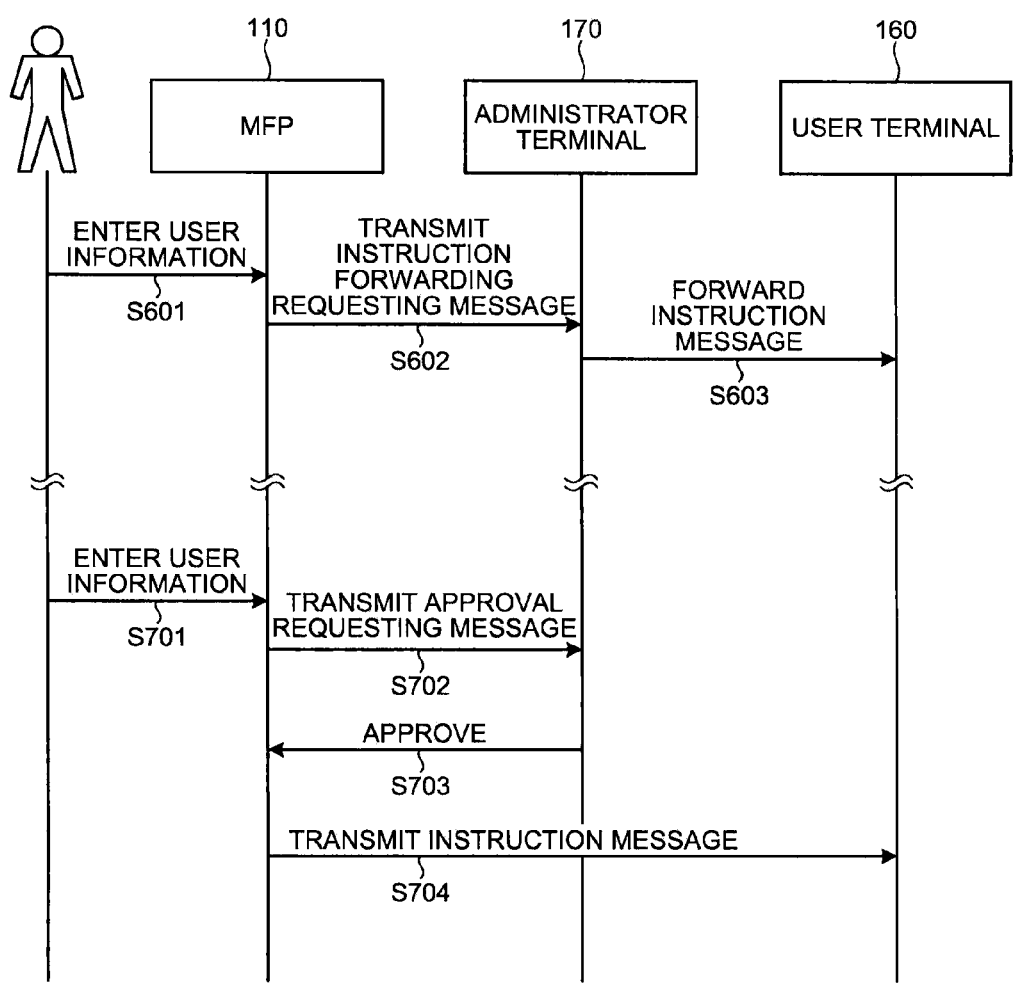
FIG. 12 is a sequence chart for explaining another embodiment in which an administrator user approves of a package distribution before an instruction email is transmitted.

Explained in the first embodiment is an example in which the instruction email is directly transmitted to the email address of the determined destination. However, depending on an operation policy of the network environment 100, there are some cases that it is preferable to enable the package to be acquired only after the administrator user grants an approval. FIG. 12 is a sequence chart for explaining another embodiment in which the instruction email is transmitted after an administrator user approves of the package distribution.

The process illustrated in FIG. 12 starts in response to a user entering an application for use and user information to the MFP 110 at Step S601. At Step S602, the MFP 110 transmits an instruction forwarding requesting message to the email address of a preconfigured administrator user. The instruction forwarding requesting message includes a message requesting an approval for the package distribution from the administrator user, the destination address of the instruction message, and a body of the instruction message.

At Step S603, the administrator terminal 170 forwards the instruction email to the destination address designated as an addressee of the forwarded email. The instruction message may be forwarded manually by the administrator user. Alternatively, a mailer may be configured so that an automatic sorting function of the mailer is used to approve and forward emails that match a given pattern. To perform the automatic sorting flexibly, some attribute information related to a user may be added to the instruction forwarding requesting message. For example, some user attribute (e.g., the job standing of the user) may be used to determine if the approval is to be granted automatically or manually.

FIG. 12 illustrates another example in which the instruction email is transmitted after the administrator user grants an approval, as indicated at Steps S701 to S704. At Step S701, a user enters his/her user information to the MFP 110. At Step S702, the MFP 110 transmits an approval requesting message to the email address of the preconfigured administrator user. The approval requesting message is a message requesting an approval for a package distribution, and embedded in the approval requesting message is a URL for communicating whether the request is approved or denied to the MFP 110. When the administrator user follows the approving URL in the approval requesting message, the MFP 110 receives an access request to the approving URL at Step S703, and triggers the process of transmitting the instruction email at Step S704.

The instruction message described above is eventually transmitted to the determined destination, but the administrator user may give an approval during this entire process. Because the instruction message is routed via the administrator, time lag occurs, but this configuration is effective when it is desirable to apply restrictions on the temporary use.

Second Embodiment

Explained in the first embodiment is an example in which all of the processes of receiving the application for use, preparing the package, and distributing the package are performed by the MFP 110. In another embodiment, these functions excluding receiving an application for use may be distributed to one or more external servers.

Figure 13:
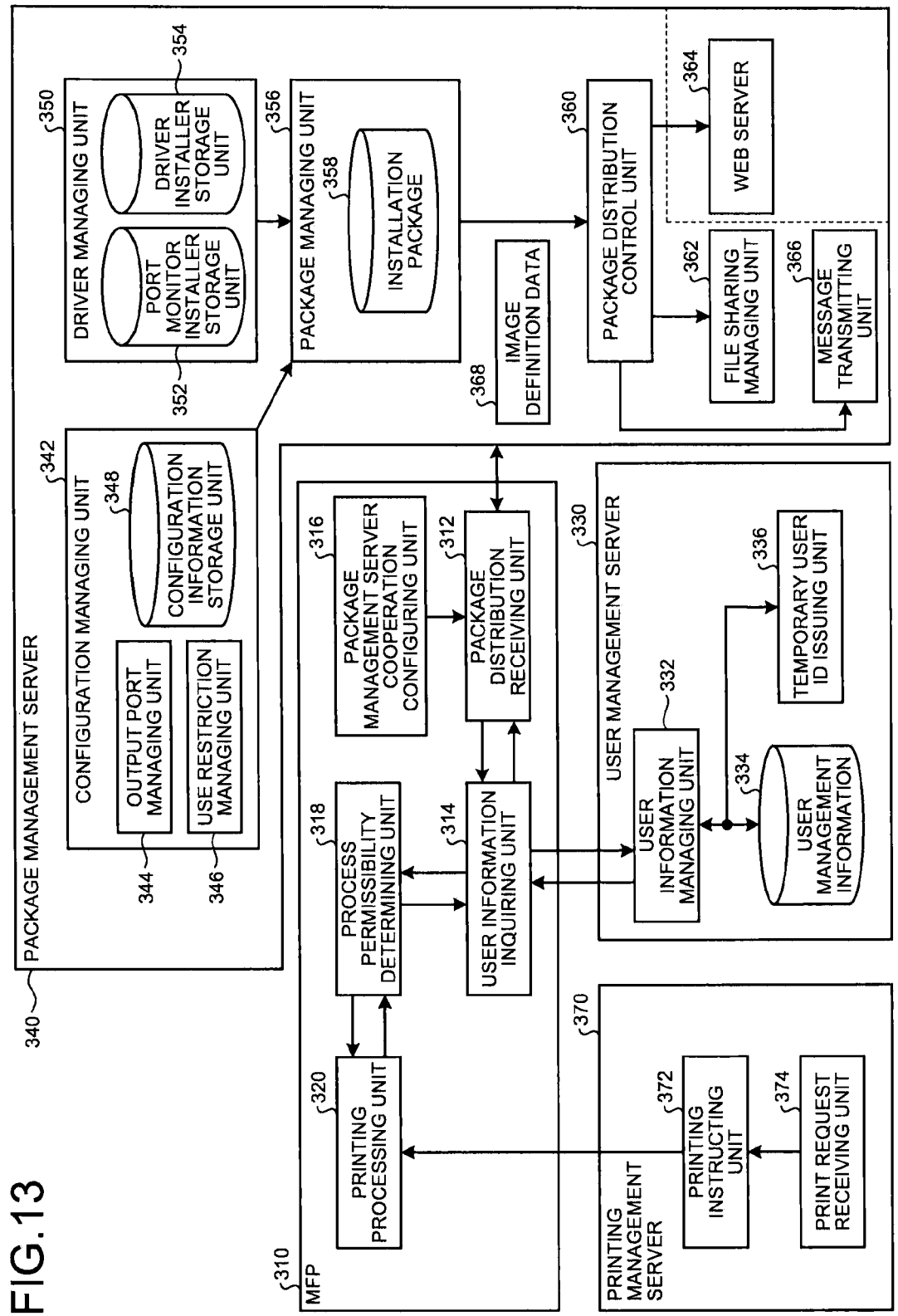
FIG. 13 is a schematic for explaining a second embodiment realized by an image processing system including an MFP and one or more servers connected to the MFP over a network.

FIG. 13 is a schematic for explaining a second embodiment realized by an image processing system including an MFP 310 and one or more servers connected to the MFP over a network. The image processing system according to the second embodiment includes the MFP 310, a user management server 330, a package management server 340, and a printing management server 370.

The MFP 310 includes a package distribution receiving unit 312, a process permissibility determining unit 318, and a printing processing unit 320, in the same manner as in the first embodiment illustrated in FIG. 3. In the second embodiment, the functional units working in the same manner as those in the first embodiment are referred under the same name. The MFP 310 according to the second embodiment further includes a user information inquiring unit 314 and a package management server cooperation configuring unit 316.

In the second embodiment, a user information managing unit 332, user management information 334, and a temporary user ID issuing unit 336 are implemented on the user management server 330. The user information inquiring unit 314 included in the MFP 310 manages communications with the user information managing unit 332 on the user management server 330, and issues inquiries related to user information entered by a user.

In the second embodiment, a configuration managing unit 342, a driver managing unit 350, a package managing unit 356, a package distribution control unit 360, a file sharing managing unit 362, a web server 364, and a message transmitting unit 366 are implemented on the package management server 340. Alternatively, the web server 364 may be implemented on a server that is different from the package management server 340, or may be implemented on the MFP 310.

The package management server 340 includes an image definition data 368 for defining various operation screens displayed on the operation panel 42 of the MFP 310, and transmits the image definition data to the MFP 310. The package management server cooperation configuring unit 316 stores therein configuration information related to a cooperation process with the package management server 340, and manages screen definition data received from the package management server 340. The image definition data 368 includes data for defining an operation screen on which a temporary use button for calling the package distribution request receiving screen illustrated in FIG. 7, and the package distribution request receiving screen.

In the MFP 110, a screen control program operating on the MFP 110 reads the screen definition data, builds an operation screen in a manner suitable for specifications of the display, such as the resolution and the gradation of the display, and displays the operation screen on the operation panel 42. The package distribution request receiving screen is displayed using the same mechanism.

The printing management server 370 includes a printing instructing unit 372 and a print request receiving unit 374. In the second embodiment, a print job is transmitted to the MFP 310 via the printing management server 370. When the print request receiving unit 374 receives a print job from a user terminal, the printing instructing unit 372 forwards the print job to the MFP 310 to instruct the MFP 310 to perform the printing.

Each of the user management server 330, the package management server 340, and the printing management server 370 is configured as a general-purpose computer device, a workstation, a blade server, or a rack-mount server. Each of the servers 330, 340, and 370 includes central processing unit (CPU), a RAM, an HDD, an SSD, and an NIC not illustrated.

FIG. 14 is a sequence chart illustrating a process performed between the MFP and a plurality of servers in the image processing system according to the second embodiment when a package distribution request is received. The process illustrated in FIG. 14 starts at Step S801 when the MFP receives an input of an application for use and user information entered by a user via an input device on the MFP 310.

At Step S802, the MFP 310 causes the user information inquiring unit 314 to inquire of the user management server 330 about the user information. At Step S803, the MFP 310 acquires a user code and an email address corresponding to the user information entered by the user. At Step S804, the MFP 310 passes the user code and the email address to the package management server 340, and requests a package preparation process from the package management server 340.

At Step S805, the package management server 340 causes the package managing unit 356 to prepare the package. At Step S806, the package management server 340 causes the package distribution control unit 360 to perform distribution control based on the package acquisition route. At Step S807, the package management server 340 causes the message transmitting unit 366 to transmit an instruction email to the email address of the determined destination, and the instruction email is communicated to a user terminal 380.

In the second embodiment, because the processes excluding receiving of an application for use are distributed to one or more external servers, the load of the MFP 310 is reduced, and hardware requirements of the MFP 310 are also reduced.

As explained above, according to the embodiments, it is possible to provide a data processing apparatus, a computer-readable recording medium that contains a computer program, and a data processing system that enables a user to configure initial settings to a target information terminal device through a simple operation and make a target data processing apparatus usable.

According to the embodiments, even in a situation described below, a user can configure initial settings through a simple operation and make a target MFP usable. For example, there might be a situation in which a user who always asks his subordinate to output prints needs to output prints himself because the user needs to prepare for a meeting while his subordinate is out of his office. Because the user has never printed anything himself, he has not installed any software modules required to print in his terminal. The user remembers receiving some notice from the information technology (IT) administrator, but the user cannot find the notice and does not know where the package distributed by the IT administrator is located.

According to the embodiments, even in such a situation, the user can acquire the package as required, and complete installation and configurations simply by entering user information to the MFP that the user wants to use and receiving an instruction message.

The present invention is also effective in a situation to be explained below. A user needs to output a print when the user is in another office. Although the user has his terminal with him, the user has not configured any settings for an MFP in this office on his terminal. In such a situation as well, the user can install a package and configure his terminal simply by entering user information to the MFP installed in this office, and receiving the instruction message via a common infrastructure.

Explained in the embodiments is an example in which the data processing apparatus is the MFP 110 or 310. However, the device for which the installer package is to be distributed is not limited to an MFP, which is explained above as an example, and may be various peripheral devices, such as printers, facsimiles, scanners, and others that are used over a network by a plurality of information terminal devices.

Furthermore, the functional units can be realized as a computer-executable program written in a legacy programming language such as an assembler, C, C++, C#, or Java (registered trademark) or an object-oriented programming language. Such a computer program is stored in an machine-readable recording medium such as a ROM, an electrically erasable programmable read-only memory (EEPROM), an erasable programmable read-only memory (EPROM), a flash memory, a flexible disk (FD), a compact disk read-only memory (CD-ROM), a compact disk rewritable (CD-RW), a digital versatile disk read-only memory (DVD-ROM), a digital versatile disk random access memory (DVD-RAM), a digital versatile disk rewritable (DVD-RW), a Blu-ray disk, an SD card, or a magneto-optical (MO) disk, or distributed over an electric communication circuit.

According to the configuration described above, an end-user can acquire information for acquiring a computer program and configuration information required to use a data processing apparatus that the user wants to use by simply going to the data processing apparatus and entering user information for requesting a permission to use the data processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus configured to distribute a computer program included in a package, the data processing apparatus comprising:
   a display configured to display a screen requesting receipt of input of user information; and
   a processor configured to,
      determine whether or not the user information corresponds to a registered user,
      determine whether there exists setting information that sets whether temporary use of the data processing apparatus by a user associated with the user information is permitted, if the user information does not correspond to the registered user,
      issue user identification information, if the setting information exists, the user identification information including information indicating use restrictions with respect to functions of the data processing apparatus,
      display, via the display, information indicating that distribution of the package for the user is not permitted, if the use restrictions do not satisfy a condition, and
      distribute the package containing the computer program according to a selected route selected by the user and the use restrictions such that the processor controls access to the selected route based on the use restrictions, if the use restrictions do satisfy the condition.

2. The data processing apparatus according to claim 1, wherein,
   the processor is configured to manage the use restrictions by managing a period of validity or use quantity restriction for using the data processing apparatus.

3. The data processing apparatus according to claim 2, wherein the processor is configured to display, on the display, information indicating that the distribution of the package for the user is not permitted, if the period of validity has expired or an upper limit of the use quantity restriction has been reached.

4. The data processing apparatus according to claim 1, wherein the processor is configured to,
   display, on the display, a screen requesting selection of the selected route for the distribution of the package from one of at least a web server, a file sharing service, and an e-mail attachment,
   receive an input from the user of the selected route, and
   distribute the package according to the selected route and the use restrictions such that the processor controls access to the selected route based on the use restrictions.

5. The data processing apparatus according to claim 4, wherein the processor is configured to control storing of the package and the configuration information by securing access thereto based on one or more of access control and password protection.

6. A non-transitory computer-readable recording medium that contains computer readable instructions that, when executed, causes a processor to distribute a computer program included in a package by,
   displaying, via a display, a screen requesting receipt of input of user information,
   determining whether or not the user information corresponds to a registered user,
   determining whether there exists setting information that sets whether temporary use of the data processing apparatus by a user associated with the user information is permitted, if the user information does not correspond to the registered user,
   issuing user identification information, if the setting information exists, the user identification information including information indicating use restrictions with respect to functions of the data processing apparatus,
   displaying, via the display, information indicating that distribution of the package for the user is not permitted, if the use restrictions do not satisfy a condition, and
   distributing the package containing the computer program according to a selected route selected by user and the use restrictions such that the processor controls access to the selected route based on the use restrictions, if the use restrictions do satisfy the condition.

7. A data processing system comprising:
   a data processing apparatus including a first processor configured to display, via a display, a screen requesting receipt of input of user information; and
   one or more servers connected to the data processing apparatus over a network, at least one of the one or more servers including a second processor configured to,
      determine whether or not the user information corresponds to a registered user,
      determine whether there exists setting information that sets whether temporary use of the data processing apparatus by a user associated with the user information is permitted, if the user information does not correspond to the registered user,
      issue user identification information, if the setting information exists, the user identification information including information indicating use restrictions with respect to functions of the data processing apparatus, display, via the display, information indicating that distribution of the package for the user is not permitted, if the use restrictions do not satisfy a condition, and distribute the package containing the computer program according to a selected route selected by the user and the use restrictions such that the processor controls access to the selected route based on the use restrictions, if the use restrictions do satisfy the condition.

8. The non-transitory computer-readable recording medium according to claim 6, wherein the computer readable instructions, when executed, causes the processor to, display, on the display, a screen requesting selection of the selected route for the distribution of the package from one of at least a web server, a file sharing service, and an e-mail attachment, receive an input from the user of the selected route, and distribute the package according to the selected route and the use restrictions such that the processor controls access to the selected route based on the use restrictions.

9. The data processing system according to claim 7, wherein the processor is configured to, display, on the display, a screen requesting selection of the selected route for the distribution of the package from one of at least a web server, a file sharing service, and an e-mail attachment, receive an input from the user of the selected route, and distribute the package according to the selected route and the use restrictions such that the processor controls access to the selected route based on the use restrictions.

* * * * *